United States Patent [19]
Miura et al.

[11] Patent Number: 5,602,812
[45] Date of Patent: Feb. 11, 1997

[54] REPRODUCING RATE CONTROL APPARATUS FOR OPTICAL DISK

[75] Inventors: Tohru Miura, Chofu; Mitsumasa Kubo, Kodaira; Akira Mashimo, Tokorozawa, all of Japan

[73] Assignee: TEAC Corporation, Japan

[21] Appl. No.: 554,736

[22] Filed: Nov. 7, 1995

[30] Foreign Application Priority Data

Nov. 24, 1994 [JP] Japan .................................. 6-289839

[51] Int. Cl.$^6$ ...................................................... G11B 5/09
[52] U.S. Cl. ............................... 369/48; 369/54; 369/60
[58] Field of Search ................................... 369/47, 48, 49, 369/50, 54, 58, 60, 124; 360/27

[56] References Cited

U.S. PATENT DOCUMENTS

| | | | |
|---|---|---|---|
| 4,631,714 | 12/1986 | Kahlman et al. | 369/60 X |
| 5,444,687 | 8/1995 | Okumura | 369/60 X |
| 5,463,607 | 10/1995 | Roth et al. | 369/60 |

Primary Examiner—Georgia Y. Epps
Assistant Examiner—P. W. Huber
Attorney, Agent, or Firm—Andrus, Sceales, Starke & Sawall

[57] ABSTRACT

A reproducing rate control apparatus for an optical disk includes a synchronizing clock generating unit which generates a synchronizing clock pulse with a phase locked to a phase of a digital reproduction signal. A signal processing unit generates a demodulated data signal from the digital reproduction signal in accordance with the synchronizing clock pulse, wherein the demodulated data signal is written to a memory in accordance with the synchronizing clock pulse, the demodulated data signal is read from the memory in accordance with a read reference clock pulse, and the read demodulated data signal is processed through an error correction so that a processed demodulated data signal is output. A frequency detecting unit detects whether the frequency of the synchronizing clock pulse is within a predetermined range of frequencies centered at a standard frequency. A switching unit selectively outputs one of a first read-reference clock pulse having an initial frequency and a second read-reference clock pulse having a second frequency to the signal processing unit in accordance with a result of the detection by the frequency detecting unit.

10 Claims, 8 Drawing Sheets

FIG. 6
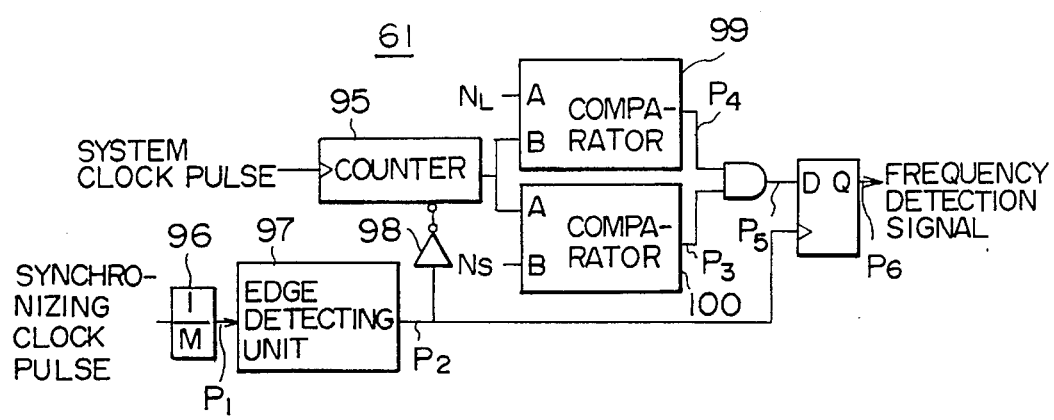
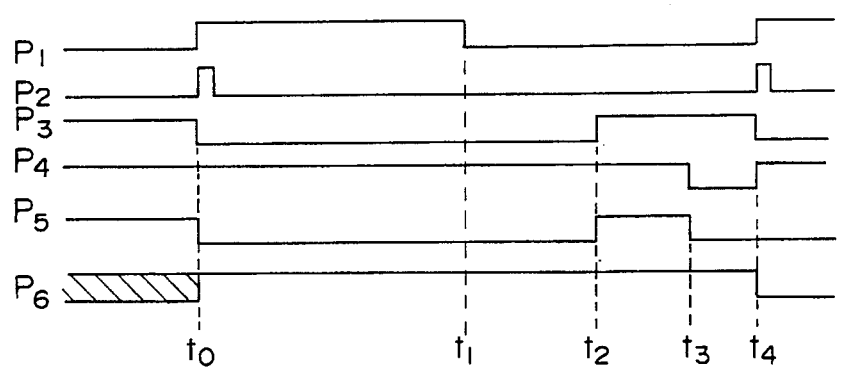
FIG.7A  $P_1$
FIG.7B  $P_2$
FIG.7C  $P_3$
FIG.7D  $P_4$
FIG.7E  $P_5$
FIG.7F  $P_6$
$t_0$  $t_1$  $t_2$  $t_3$  $t_4$

REPRODUCING RATE CONTROL APPARATUS FOR OPTICAL DISK

BACKGROUND OF THE INVENTION

1. Field of the Invention

The present invention generally relates to optical disk signal reproduction, and more particularly to a reproducing rate control apparatus for an optical disk in which data pieces and clock components for respective data pieces are recorded on the optical disk at a constant linear velocity.

2. Description of the Related Art

A CD-ROM (compact disc-read only memory) disk is a type of an optical disk. Similarly to an audio CD (compact disk), digital data signals are recorded on the CD-ROM disk by using an EFM (eight-to-fourteen modulation) method. That is, the CD-ROM disk is in such a data recording format that a length of a frame (which is a unit of data recorded thereon) is invariable regardless of whether the frame is located on an inner track of the disk or on an outer track of the disk.

In a CD-ROM reproducing system, a scanning of the CD-ROM disk is performed at a constant linear velocity by using an optical pickup when the disk is rotated, in order to reproduce a data signal from the CD-ROM disk at a constant bit rate. To perform the scanning of the disk, a rotating speed of a spindle motor which rotates the CD-ROM disk is controlled at the constant linear velocity, so that the rotating speed of the CD-ROM disk is varied in accordance with a position of the pickup in a radial direction of the CD-ROM disk.

FIG. 1 shows a conventional CD-ROM reproducing system 110. In this conventional CD-ROM reproducing system 110, a CD-ROM disk 21 (which will be called the disk 21) is rotated by a spindle motor 23. Digital signals are recorded on the disk 21 by using the EFM method, and the density of recorded data is constant in all areas of the disk 21.

In the conventional CD-ROM reproducing system 110, a self-clock frequency control operation is performed, which will be described below.

To reproduce data signals from the disk 21, a scanning of the disk 21 is performed by an optical pickup 24 (which will be called the pickup 24) in accordance with the CLV (constant linear velocity) method. The pickup 24 irradiates the disk 21 with a light ray, and reads data signals from a reflected ray from the disk 21. Data signals are reproduced from the disk 21 at a predetermined bit rate.

The disk 21 is rotated by the spindle motor 23 at a controlled rotating speed. The spindle motor control unit 40 generates a motor speed control signal to control a rotating speed (or a number of revolutions per minute) of the spindle motor 23. The scanning of the disk 21 is performed by the pickup 24 when the disk 21 is rotated at a reference-line rotating speed.

A pickup servo control unit 25 generates a focusing control signal to the pickup 24 based on a reproduce signal from the pickup 24, so that a focusing of the pickup 24 is performed. Also, the pickup servo control unit 25 generates a tracking control signal to the pickup 24 in accordance with a tracking command from a control CPU 45, to control a tracking of the pickup 24. Also, the pickup servo control unit 25 generates a seek control signal to the pickup 24 in accordance with a seek command from the control CPU 45, to control a seeking of the pickup 24. In the seeking operation, the pickup 24 is moved in a radial direction of the disk 21 to search for a desired track of the disk 21.

In a data reproducing mode, the pickup servo control unit 25 controls the tracking of the pickup 24 to the disk 21. In a seeking mode, the pickup servo control unit 25 controls the movement of the pickup 24 in the radial direction to a desired track of the disk 21.

When the seeking mode is performed, the control CPU 45 detects the amount of movement of the pickup 24 required to move it from the present track to the desired track for the seeking in accordance with a tracking error signal from the pickup servo control unit 25, and controls the movement of the pickup 24 from the present track to the desired track.

A waveform shaping unit 32 generates an EFM signal from the reproduction signal output from the pickup 24. The reproduction signal from the pickup 24 is amplified, and a waveform of the amplified signal is shaped. The EFM signal generated by the waveform shaping unit 32 is a digital reproduction signal derived from the reproduction signal from the pickup 24.

A synchronizing clock generating unit 33 generates a synchronizing clock pulse having a phase which is locked to a phase of the EFM signal output from the waveform shaping unit 32. The synchronizing clock pulse from the synchronizing clock generating unit 33 is supplied to various units of the CD-ROM reproducing system 110.

A self-clock frequency sweeping unit 46 supplies a frequency control signal to the synchronizing clock generating unit 33 when the synchronizing clock pulse from the synchronizing clock generating unit 33 is in an asynchronous state with the EFM signal. In the self-clock frequency sweeping unit 46, a sweeping of the self-clock pulse frequency in a triangular waveform within a lock range of frequencies from the synchronizing clock generating unit 33 is performed.

A synchronous-state detecting unit 34 inputs the EFM signal output from the waveform shaping unit 32 and the synchronizing clock pulse output from the synchronizing clock generating unit 33. The synchronous-state detecting unit 34 detects whether the synchronizing clock pulse is in a synchronous state. More specifically, it detects whether a synchronizing pattern (e.g., a frame synchronizing pattern "11T/11T", where T is a period of one bit) of the synchronizing clock pulse is in accordance with a synchronizing pattern of the EFM signal. When the synchronous state of the synchronizing clock pulse is detected, the synchronous-state detecting unit 34 outputs an ON signal indicative of the synchronous state of the synchronizing clock pulse. Otherwise the synchronous-state detecting unit 34 outputs an OFF signal indicative of the asynchronous state of the synchronizing clock pulse. The ON signal is supplied to each of the self-clock frequency sweeping unit 46, a spindle motor servo control unit 111, and a digital signal processing unit 35.

A system clock generating unit 58 generates a sequence of system clock pulses from a crystal oscillator. The crystal oscillator can provide system clock pulses with accurate frequency. The sequence of the system clock pulses from the system clock generating unit 58 are supplied to each of the signal processing unit 35 and the spindle motor servo control unit 40.

The spindle motor control unit 111 controls a rotating speed (or a number of revolutions per second) of the spindle motor 23 so that the scanning of the disk 21 is performed by the pickup 24 with a reference-line rotating speed, regardless of the movement of the pickup 24 in a radial direction of the disk 21.

The spindle motor control unit 111 generates a motor speed control signal to the spindle motor 23 when the synchronizing clock pulse from the unit 33 is in a synchronous state with the EFM signal from the unit 32 during the data reproducing mode. The rotating speed of the spindle motor 23 is controlled by the motor speed control signal from the spindle motor control unit 111, so that the disk 21 is rotated at the reference-line rotating speed.

In the spindle motor servo control unit 111, a frequency 1/M times (where M is an integer) the initial frequency of the synchronizing clock pulse from the unit 33 is compared with a frequency 1/N times (where N is an integer) the initial frequency of the system clock pulse from the system clock generating unit 58. In the spindle motor servo control unit 111, the phase of the synchronizing clock pulse having the 1/M times frequency is compared with the phase of the system clock pulse having the 1/N times frequency. The spindle motor servo control unit 111 supplies the motor speed control signal to the spindle motor 23.

When the synchronizing clock pulse from the unit 33 is in an asynchronous state with the EFM signal from the unit 32 after the end of the seeking mode, the spindle motor servo control unit 111 detects a greatest pulsewidth "11T" included in the EFM signal, and generates a pseudo-synchronizing clock pulse having a frequency inversely proportional to the pulsewidth "11T". The spindle motor servo control unit 111 generates a motor speed control signal by comparing the 1/M times frequency of the pseudo-synchronizing clock pulse with the 1/N times frequency of the system clock pulse. The spindle motor control unit 111 thus generates a motor speed control signal and supplies it to the spindle motor 23.

The integers M and N are preset to values that make the frequency of the synchronizing clock pulse and the frequency of the system clock pulse equal to each other when the frequency of the synchronizing clock pulse accords with a standard frequency.

The digital signal processing unit 35 includes a demodulator unit 51, a sub-code demodulator unit 52, a RAM (random access memory) 53, an error correcting unit 54, a bus 56 interconnecting the units 51, 52, 53 and 54, an address generator unit 55, and a timing control unit 113.

The demodulator unit 51 generates a demodulated data signal from the EFM signal in accordance with the synchronizing clock pulse when the synchronizing clock pulse is in the synchronous state with the EFM signal. The 14-bit data of the EFM signal is converted into the 8-bit data of the demodulated data signal. The demodulated data signal from the demodulator unit 51 is written to the RAM 53 via the bus 56. The sub-code demodulator unit 52 extracts a sub-code from the demodulated data signal from the demodulator unit 51 and supplies the sub-code to the control CPU 45.

The timing control unit 113 generates a first timing clock in accordance with a read reference clock pulse supplied from the system clock generating unit 58 and the synchronizing clock pulse supplied from the synchronizing clock generating unit 33, and supplies the first timing clock to each of the demodulator unit 51 and the address generator unit 55. The address generator unit 55 which is responsive to the first timing clock generates a first address signal. Thus, the demodulated data signal from the demodulator unit 52 is written to the RAM 53 at an address indicated by the first address signal in accordance with the first timing clock.

The timing control unit 113 generates a second timing clock, a third timing clock and a fourth timing clock in accordance with the read reference clock pulse supplied from the system clock generating unit 58. The timing control unit 113 supplies the second timing clock to each of the error correcting unit 54 and the address generator unit 55. The address generator unit 55 which is responsive to the second timing clock generates a second address signal. The demodulated data signal stored in the RAM 53 at an address indicated by the second address signal is read out in accordance with the second timing clock, and the demodulated data signal is supplied to the error correcting unit 54 via the bus 56.

The error correcting unit 54 performs an error correcting process for the demodulated data signal which was read from the RAM 53 in accordance with the second timing signal. The timing control unit 113 supplies the third timing clock to each of the error correcting unit 54 and the address generating unit 55. The address generator unit 55, responsive to the third timing clock, generates a third address signal. The demodulated data signal output from the error correcting unit 54 after the end of the error correcting process, is written to the RAM 53 at an address indicated by the third address signal in accordance with the third timing clock.

The timing control unit 113 supplies the fourth timing clock to each of a CD-ROM control unit 57 and the address generator unit 55. The address generator unit 55, responsive to the fourth timing clock, generates a fourth address signal. The demodulated data signal (which is error-corrected) stored in the RAM 53 at an address indicated by the fourth address signal is read out and supplied to the CD-ROM control unit 57 via the bus 56 in accordance with the fourth timing clock.

The demodulated data signal from the CD-ROM control unit 57 is transferred to a host system.

The above-described data flow in the digital signal processing unit 35 can be summarized as follows:
(1) the data signal transferred from the demodulator unit 51 to the RAM 53;
(2) the data signal transferred from the RAM 53 to the error correcting unit 54;
(3) the error-corrected data signal transferred from the error correcting unit 54 to the RAM 53; and
(4) the error-corrected data signal transferred from the RAM 53 to the CD-ROM control unit 57.

The timing clock and the address signal used when transferring the data signal from the demodulator unit 51 to the RAM 53 are the first timing clock and the first address signal, which are generated in accordance with the synchronizing clock pulse.

The timing clock and the address signal used when transferring the data signal from the RAM 53 to the error correcting unit 54 are the second timing clock and the second address signal, which are generated in accordance with the read reference clock pulse.

The timing clock and the address signal used when transferring (or writing) the error-corrected data signal from the error correcting unit 54 to the RAM 53 are the third timing clock and the third address signal, which are generated in accordance with the read reference clock pulse.

The timing clock and the address signal used when transferring (or reading out) the error-corrected data signal from the RAM 53 to the CD-ROM control unit 57 are the fourth timing clock and the fourth address signal, which are generated in accordance with the read reference clock pulse.

The rate of the data signal supplied by the demodulator unit 51 is the same as the rate of the data signal read by the pickup 24 from the disk 21. Thus, the data signal supplied by the demodulator unit 51 includes a jitter component. To eliminate the jitter component, the data signal is temporarily written to the RAM 53 in accordance with the synchronizing clock pulse, and the data signal is read out from the RAM 53 in accordance with the read reference clock pulse.

The CD-ROM control unit 57 is connected to the digital signal processing unit 35. The error-corrected data signal from the RAM 53 is supplied to the CD-ROM control unit 57, and the fourth timing clock from the timing control unit 113 is supplied to the CD-ROM control unit 57. Thus, the error-corrected data signal from the RAM 53 is transferred to the CD-ROM control unit 57 in accordance with the fourth timing clock. The error-corrected data signal from the CD-ROM control unit 57 is supplied to the host computer.

The control CPU 45 controls the data reproducing operation and the seeking operation in accordance with a command signal supplied from the CR-ROM control unit 57. When the seeking operation is performed, the control CPU 45 generates a seeking command by using the address data in the sub-code extracted by the sub-code demodulator unit 52, and supplies it to the pickup servo control unit 25. Also, the control CPU 45 supplies an open-loop control command to the spindle motor control unit 111 so that an open-loop control operation of the spindle motor 23 is performed during the seeking operation.

In the above CD-ROM reproducing system 110, the self-clock frequency control operation is performed by using the self-clock frequency sweeping unit 46 to speed up the demodulation, the error correction and the data transferring operations of the digital signal processing unit 35.

However, the system clock pulse which is the read reference clock at which rate the data signal is read from or written to the RAM 53 is invariable in the above CD-ROM reproducing system 110. The frequencies of the second, third and fourth timing clocks which are generated in accordance with the read reference clock are constant. Therefore, the rate at which the data signal is read from or written to the RAM 53 is always constant even though a deviation of the synchronizing clock frequency from the standard frequency is great.

When a variable range of the self-clock frequency of the clock pulse supplied to the digital signal processing unit 35 is set to be wide, the difference between the synchronizing clock frequency and the standard frequency becomes great. If the variable range of the self-clock frequency is too wide, the quantity of data to be written to the RAM 53 may exceed the storage capacity of the RAM 53 when the rate of writing the demodulated data signal to the RAM 53 is high. Or, the quantity of data to be read from the RAM 53 may be greater than the quantity of data signals stored in the RAM 53 when the rate of writing the demodulated data signal to the RAM 53 is low.

Therefore, in the above CD-ROM reproducing system 110, it is difficult to set the variable range of the self-clock frequency to be wide in order to speed the digital signal processing. It is desirable to provide a CR-ROM reproducing system which performs the digital signal processing without causing the above-described problem even when the variable range of the self-clock frequency is wide.

SUMMARY OF THE INVENTION

An object of the present invention to provide an improved optical disk reproducing system in which the above-described problems are eliminated.

Another, more specific object of the present invention is to provide a reproducing rate control apparatus for use in an optical disk reproducing system, which reliably performs the digital signal processing at a high reproducing rate even when the variable range of the self-clock frequency is set to be wide.

The above-mentioned objects of the present invention are achieved by a reproducing rate control apparatus which includes: a digitizing unit for generating a digital reproduction signal from a reproduction signal which is generated by an optical pickup from an optical disk; a synchronizing clock generating unit, coupled to an output of the digitizing unit, for generating a synchronizing clock pulse with a phase locked to a phase of the digital reproduction signal; a signal processing unit, coupled to the output of the digitizing unit and an output of the synchronizing clock generating unit, for generating a demodulated data signal from the digital reproduction signal in accordance with the synchronizing clock pulse, wherein the demodulated data signal is written to a memory in accordance with the synchronizing clock pulse, the demodulated data signal is read from the memory in accordance with a read reference clock pulse, and the read demodulated data signal is processed through an error correction so that a processed demodulated data signal is output; a frequency detecting unit, coupled to the output of the synchronizing clock generating unit, for detecting whether the frequency of the synchronizing clock pulse is within a predetermined range of frequencies centered at a standard frequency; a first clock generating unit for generating a first read-reference clock pulse having an initial frequency from an oscillator; a second clock generating unit, coupled to the output of the synchronizing clock generating unit, for generating a second read-reference clock pulse having a second frequency proportional to a frequency of the synchronizing clock pulse; and a switching unit, coupled to an output of the first clock generating unit and an output of the second clock generating unit, for selectively outputting one of the first read-reference clock pulse and the second read-reference clock pulse to the signal processing unit in accordance with a result of the detection by the frequency detecting unit. In the above reproducing rate control apparatus, when the frequency of the synchronizing clock pulse is within the predetermined range, the first read-reference clock pulse is supplied from the switching unit to the signal processing unit, and, when the frequency of the synchronizing clock pulse is not within the predetermined range, the second read-reference clock pulse is supplied from the switching unit to the signal processing unit.

The reproducing rate control apparatus of the present invention supplies the second read-reference clock pulse to the signal processing unit when the frequency of the synchronizing clock pulse is not within the predetermined range. The second read-reference clock pulse has a frequency that is proportional to the frequency of the synchronizing clock pulse. It is possible that the rate of writing the demodulated data signal to the memory is synchronous with the rate of reading the demodulated data signal from the memory. Even when the variable range of the self-clock frequency is wide, the quantity of data to be written to the memory does not exceed the storage capacity of the memory if the rate of writing the demodulated data signal to the memory is high. Or, the quantity of data to be read from the memory does not exceed the quantity of data signals stored in the memory if the rate of writing the demodulated data signal to the memory is low.

BRIEF DESCRIPTION OF THE DRAWINGS

The above and other objects, features and advantages of the present invention will be more apparent from the following detailed description when read in conjunction with the accompanying drawings in which:

FIG. 6 is a block diagram of a frequency detecting unit in the CD-ROM reproducing system in FIG. 2;

FIGS. 7A through 7F are time charts for explaining digital signals at various points of the frequency detecting unit in FIG. 6;

DESCRIPTION OF THE PREFERRED EMBODIMENTS

A description will now be given of preferred embodiments of the present invention with reference to the accompanying drawings.

Figure 1:
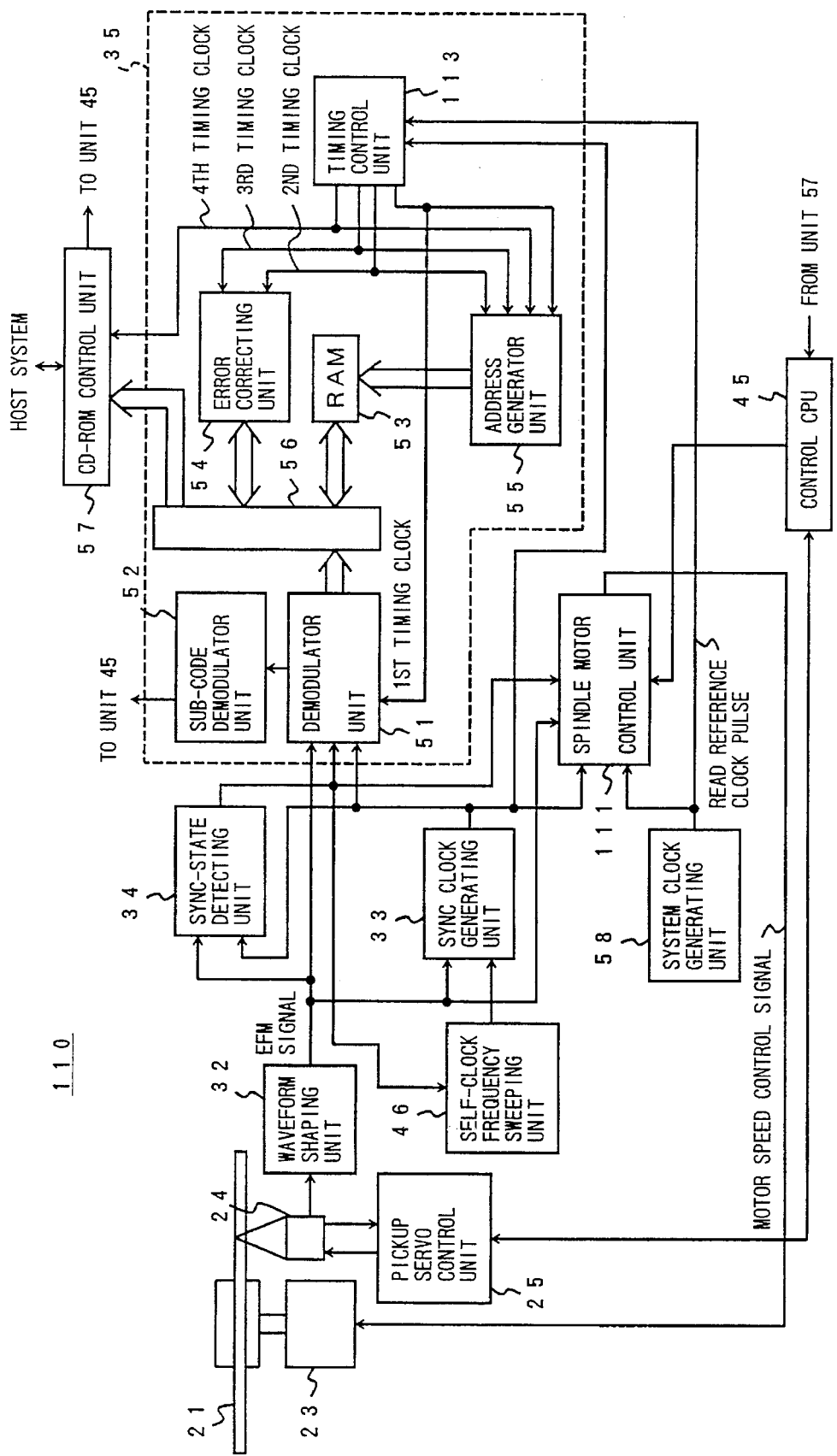
FIG. 1 is a block diagram of a conventional CD-ROM reproducing system.
Figure 2:
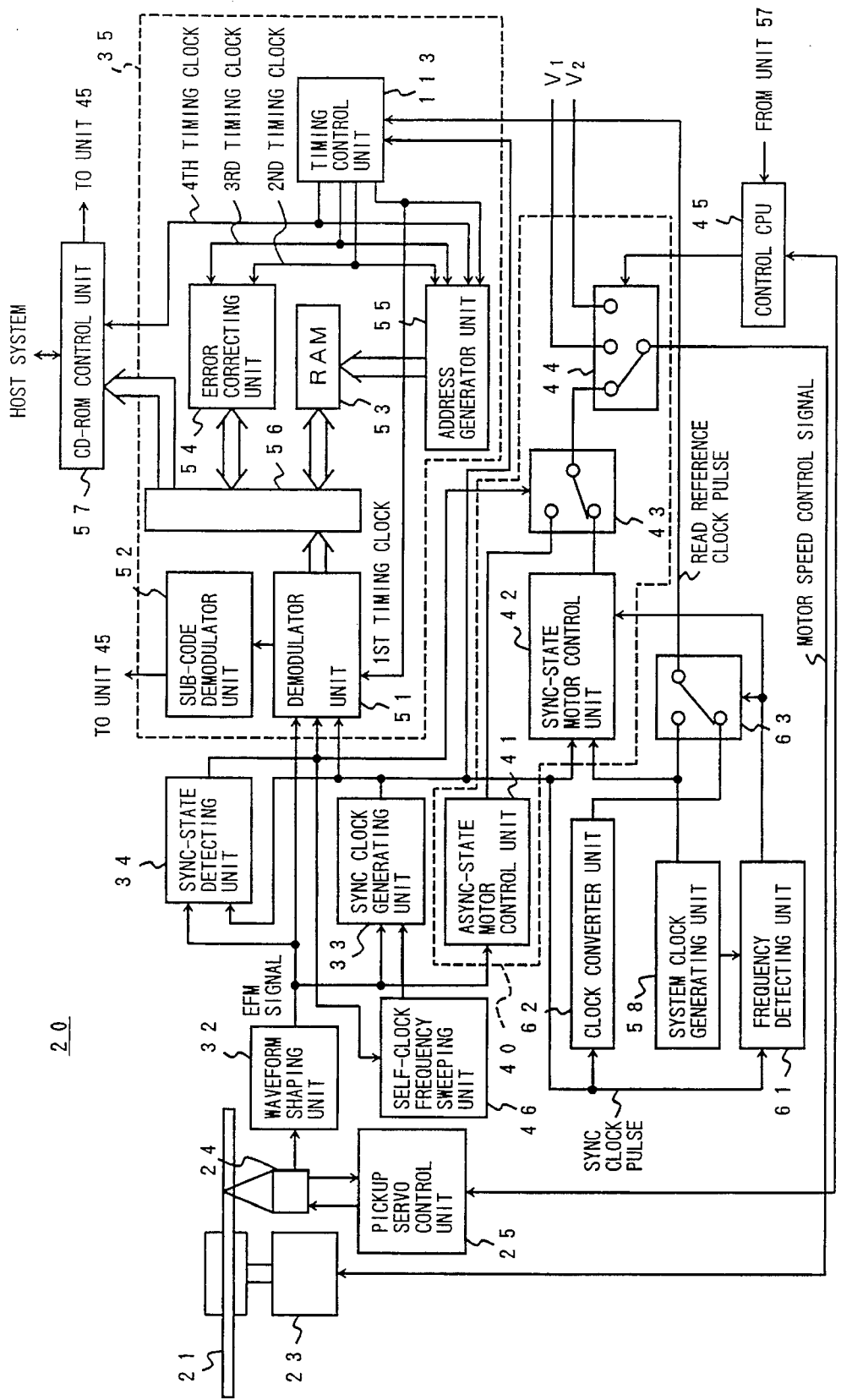
FIG. 2 is a block diagram of a CD-ROM reproducing system in a first embodiment of the present invention.

FIG. 2 shows a CD-ROM reproducing system 20 in a first embodiment of the present invention. In FIG. 2, the elements which are the same as corresponding elements in FIG. 1 are designated by the same reference numerals, and a description thereof will be omitted.

To reproduce data signals from the disk 21, a scanning of the disk 21 is performed by the pickup 24 in accordance with the CLV (constant linear velocity) method. The pickup 24 irradiates the disk 21 with a light ray, and reads data signals from a reflected ray from the disk 21. Data signals are reproduced from the disk 21 at a predetermined bit rate.

The disk 21 is rotated by the spindle motor 23 at a controlled rotating speed. The spindle motor control unit 40 generates a motor speed control signal to control a rotating speed (or a number of revolutions per minute) of the spindle motor 23. The scanning of the disk 21 is performed by the pickup 24 when the disk 21 is rotated at a reference-line rotating speed.

The pickup servo control unit 25 generates a focusing control signal to the pickup 24 based on a reproduce signal from the pickup 24, so that a focusing of the pickup 24 is performed. Also, the pickup servo control unit 25 generates a tracking control signal to the pickup 24 in accordance with a tracking command from a control CPU 45, to control a tracking of the pickup 24. Also, the pickup servo control unit 25 generates a seek control signal to the pickup 24 in accordance with a seek command from the control CPU 45, to control a seeking of the pickup 24. In the seeking operation, the pickup 24 is moved in a radial direction of the disk 21 to search for a desired track of the disk 21.

In a data reproducing mode, the pickup servo control unit 25 controls the tracking of the pickup 24 to the disk 21. In a seeking mode, the pickup servo control unit 25 controls the movement of the pickup 24 in the radial direction to a desired track of the disk 21.

When the seeking mode is performed, the control CPU 45 detects the amount of movement of the pickup 24 required to move it from the present track to the desired track for the seeking in accordance with a tracking error signal from the pickup servo control unit 25, and controls the movement of the pickup 24 from the present track to the desired track.

The waveform shaping unit 32 generates an EFM signal from the reproduction signal output from the pickup 24. The reproduction signal from the pickup 24 is amplified, and a waveform of the amplified signal is shaped. The EFM signal generated by the waveform shaping unit 32 is a digital reproduction signal derived from the reproduction signal from the pickup 24.

The synchronizing clock generating unit 33 generates a synchronizing clock pulse having a phase which is locked to a phase of the EFM signal output from the waveform shaping unit 32. The synchronizing clock pulse from the synchronizing clock generating unit 33 is supplied to various units of the CD-ROM reproducing system 20.

The self-clock frequency sweeping unit 46 supplies a frequency control signal to the synchronizing clock generating unit 33 when the synchronizing clock pulse from the synchronizing clock generating unit 33 is in an asynchronous state with the EFM signal. In the self-clock frequency sweeping unit 46, a sweeping of the self-clock pulse frequency in a triangular waveform within a lock range of frequencies from the synchronizing clock generating unit 33 is performed.

The synchronous-state detecting unit 34 inputs the EFM signal output from the waveform shaping unit 32 and the synchronizing clock pulse output from the synchronizing clock generating unit 33. The synchronous-state detecting unit 34 detects whether the synchronizing clock pulse is in a synchronous state. More specifically, it detects whether a synchronizing pattern of the synchronizing clock pulse is in accordance with a synchronizing pattern of the EFM signal. When the synchronous state of the synchronizing clock pulse is detected, the synchronous-state detecting unit 34 outputs an ON signal indicative of the synchronous state of the synchronizing clock pulse. Otherwise the synchronous-state detecting unit 34 outputs an OFF signal indicative of the asynchronous state of the synchronizing clock pulse. The ON signal is supplied to each of the self-clock frequency sweeping unit 46, a spindle motor servo control unit 40, and the signal processing unit 35.

The system clock generating unit 58 generates a sequence of system clock pulses from a crystal oscillator. The crystal oscillator can provide system clock pulses with accurate frequency. The sequence of the system clock pulses from the system clock generating unit 58 are supplied to each of the signal processing unit 35 and the spindle motor servo control unit 40.

The CD-ROM reproducing system 20 includes the spindle motor servo control unit 40 which is indicated by a dotted line in FIG. 2. The spindle motor servo control unit 40 includes a synchronous-state motor control unit 42, an asynchronous-state motor control unit 41, a switch 43, and a switch 44.

When the synchronizing clock pulse is in the synchronous state, the spindle motor servo control unit 40 supplies a motor speed control signal from the synchronous-state motor control unit 42 to the spindle motor 23. When the synchronizing clock pulse is in the asynchronous state, the spindle motor servo control unit 40 supplies a motor speed control signal from the asynchronous-state motor control unit 40 to the spindle motor 23.

Figure 3:
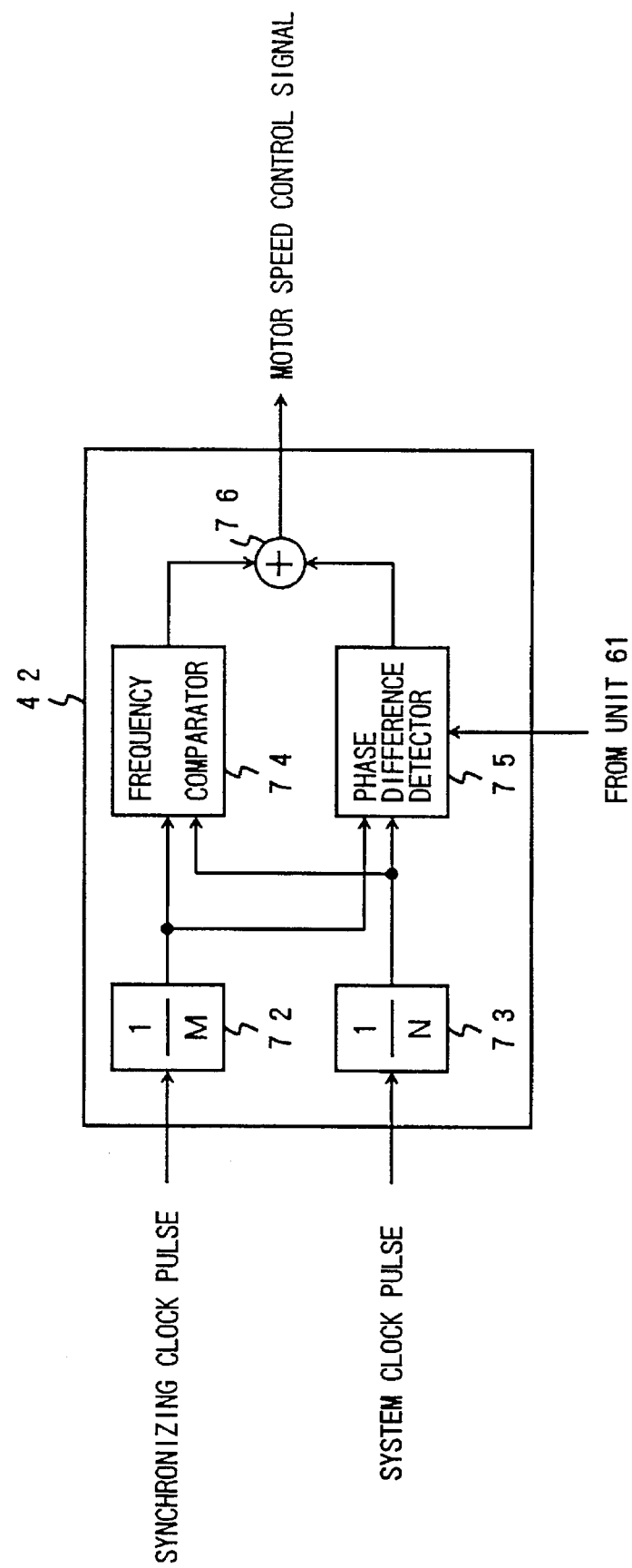
FIG. 3 is a block diagram of a synchronous-state motor control unit in the CD-ROM reproducing system in FIG. 2.

FIG. 3 shows the synchronous-state motor control unit 42 in the CD-ROM reproducing system 20 in FIG. 2. In FIG. 3, the synchronous-state motor control unit 42 includes a frequency divider (1/M) 72, a frequency divider (1/N) 73, a frequency comparator 74, a phase difference detector 75, and an adder 76.

Referring to FIG. 3, the frequency divider (1/M) 72 generates a synchronizing clock pulse with a modified frequency that is 1/M (where M is an integer) times the initial frequency of the synchronizing clock pulse from the synchronizing clock generating unit 33. The synchronizing clock pulse from the frequency divider 72 is supplied to each of the frequency comparator 74 and the phase difference detector 75.

The frequency divider (1/N) 73 generates a system clock pulse with a modified frequency that is 1/N (where N is an integer) times the initial frequency of the system clock pulse from the system clock generating unit 58. The system clock pulse from the frequency divider 73 is supplied to each of the frequency comparator 74 and the phase difference detector 75.

The frequency comparator 74 compares the modified frequency of the synchronizing clock pulse with the modified frequency of the system clock pulse, and supplies a signal indicative of the result of the comparison to the adder 76. The phase difference detector 75 detects a phase difference between a phase of the synchronizing clock pulse and a phase of the system clock pulse, and supplies a signal indicative of the phase difference to the adder 76. The adder 76 outputs a motor speed control signal which indicates a sum of the signal output from the frequency comparator 74 and the signal output from the phase difference detector 75.

The phase difference detector 75 is stopped when an ON signal from a frequency detecting unit 61 (which will be described later) is not supplied to the phase difference detector 75.

The motor speed control signal generated by the above synchronous-state motor control unit 42 is supplied to an input of the switch 43.

The asynchronous-state motor control unit 41 generates a pseudo-synchronizing signal from patterns "11T" which are components of the EFM signal having a greatest pulsewidth therein. The pseudo-synchronizing signal has a frequency that is inversely proportional to the length of the patterns "11T". The asynchronous-state motor control unit 41 generates a motor speed control signal by comparing a frequency of the pseudo-synchronizing signal with a frequency of a reference signal. By supplying the motor speed control signal to the spindle motor 23, the rotating speed of the spindle motor 23 is brought into the standard rotating speed.

The motor speed control signal generated by the above asynchronous-state motor control unit 40 is supplied to the other input of the switch 43.

The switch 43 is controlled by the ON/OFF signal supplied from the synchronous-state detecting unit 34. The switch 43 includes the two inputs connected to the synchronous-state motor control unit 42 and the asynchronous-state motor control unit 40, and an output connected to an input of the switch 44.

When the synchronizing clock pulse is detected to be in the synchronous state, the motor speed control signal from the synchronous-state motor control unit 42 is supplied to the switch 44 via the switch 43. When the synchronizing clock pulse is detected to be in the asynchronous state, the motor speed control signal from the asynchronous-state motor control unit 40 is supplied to the switch 44 via the switch 43.

The switch 44 is controlled by a control signal supplied from the control CPU 45. In the switch 44, the motor speed control signal from the switch 43 is supplied from the switch 44 to the spindle motor 23 unless the pickup 24 is moved in the seeking mode.

After the seeking of the pickup 24 is performed, the synchronizing clock pulse from the synchronizing clock generating unit 33 is in the asynchronous state. At this time, the motor speed control signal from the asynchronous-state motor control unit 41 is supplied to the spindle motor 23. The rotating speed of the spindle motor 23 is controlled by the motor speed control signal so that the rotating speed of the disk 21 approaches the reference-line rotating speed.

During the data reproducing operation, the synchronizing clock pulse from the synchronizing clock generating unit 33 is in the synchronous state. At this time, the motor speed control signal from the synchronous-state motor control unit 42 is supplied to the spindle motor 23. The rotating speed of the spindle motor 23 is controlled by the motor speed control so that the disk 21 is rotated at the reference-line rotating speed.

When the seeking of the pickup 24 is performed, the control CPU 45 supplies a control signal to the switch 44 so that an acceleration voltage V1 or a deceleration voltage V2 is selected through the switch 44 according to a direction of the radial movement of the pickup 24. The acceleration voltage V1 or the deceleration voltage V2 is supplied from the switch 44 to the spindle motor 23 so that the rotating speed of the spindle motor 23 is controlled during the radial movement of the pickup 24.

The CD-ROM reproducing system 20 includes a clock converter unit 62. The clock converter unit 62 generates a second synchronizing clock pulse with a modified frequency from the synchronizing clock pulse with the initial frequency supplied from the synchronizing clock generating unit 33. The modified frequency of the second synchronizing clock pulse is N/M times the initial frequency of the synchronizing clock pulse from the synchronizing clock generating unit 33, where M and N are integers that are preset such that the modified frequency of the second synchronizing clock pulse is equal to the frequency of the system clock pulse when the frequency of the synchronizing clock pulse accords with the standard frequency.

The CD-ROM reproducing system 20 includes a frequency detecting unit 61. The frequency detecting unit 61 detects whether the frequency of the synchronizing clock pulse from the synchronizing clock generating unit 33 is within a predetermined range of frequencies centered at the standard frequency. The frequency detecting unit 61 generates an ON signal when the frequency of the synchronizing clock pulse is within the predetermined range. Otherwise the frequency detecting unit 61 generates an OFF signal. The predetermined range of frequencies is set to a relatively narrow range of frequencies, for example, a range of the standard frequency ±1%.

The ON/OFF signal from the frequency detecting unit 61 is supplied to a switch 63. The switch 63 is controlled by the ON/OFF signal. Also, the ON/OFF signal from the frequency detecting unit 61 is supplied to the synchronous-state motor control unit 42. The phase difference detector 75 of the synchronous-state motor control unit 42 is controlled by the ON/OFF signal, as described above.

The switch 63 includes an input connected to the clock converter unit 62, an input connected to the system clock generating unit 58, and an output connected to the timing control unit 113.

When the frequency of the synchronizing clock pulse is within the predetermined range, the ON signal from the frequency detecting unit 61 is supplied to the switch 63. The system clock pulse from the system clock generating unit 58 is output to the timing control unit 113 through the switch 63.

On the other hand, when the frequency of the synchronizing clock pulse is outside the predetermined range, the OFF signal from the frequency detecting unit 61 is supplied to the switch 63. The second synchronizing clock pulse from the clock converter unit 62 is output to the timing control unit 113 through the switch 63.

In the digital signal processing unit 35, the demodulator unit 51 generates a demodulated data signal from the EFM signal in accordance with the synchronizing clock pulse when the synchronizing clock pulse is in the synchronous state with the EFM signal. The demodulated data signal from the demodulator unit 51 is written to the RAM 53 via the bus 56. The sub-code demodulator unit 52 extracts a sub-code from the demodulated signal from the demodulator unit 51 and supplies the sub-code to the control CPU 45.

The timing control unit 113 generates a first timing clock in accordance with the read reference clock pulse supplied from the switch 63, and supplies the first timing clock to each of the demodulator unit 51 and the address generator unit 55. The address generator unit 55 which is responsive to the first timing clock generates a first address signal. Thus, the demodulated data signal from the demodulator unit 52 is written to the RAM 53 at an address indicated by the first address signal in accordance with the first timing clock.

The timing control unit 113 generates a second timing clock, a third timing clock and a fourth timing clock in accordance with the read reference clock pulse supplied from the switch 63. The timing control unit 113 supplies the second timing clock to each of the error correcting unit 54 and the address generator unit 55. The address generator unit 55 which is responsive to the second timing clock generates a second address signal. The demodulated data signal stored in the RAM 53 at an address indicated by the second address signal is read out in accordance with the second timing clock, and the demodulated data signal is supplied to the error correcting unit 54 via the bus 56.

The error correcting unit 54 performs an error correcting process for the demodulated data signal which was read from the RAM 53 in accordance with the second timing signal. The timing control unit 113 supplies the third timing clock to each of the error correcting unit 54 and the address generating unit 55. The address generator unit 55, responsive to the third timing clock, generates a third address signal. The demodulated data signal output from the error correcting unit 54 after the end of the error correcting process, is written to the RAM 53 at an address indicated by the third address signal in accordance with the third timing clock.

The timing control unit 113 supplies the fourth timing clock to each of the CD-ROM control unit 57 and the address generator unit 55. The address generator unit 55, responsive to the fourth timing clock, generates a fourth address signal. The demodulated data signal (which is error-corrected) stored in the RAM 53 at an address indicated by the fourth address signal is read out and supplied to the CD-ROM control unit 57 via the bus 56 in accordance with the fourth timing clock.

As described above, when the frequency of the synchronizing clock pulse is within the predetermined range, the system clock pulse from the system clock generating unit 58 is supplied as the read reference clock pulse to the timing control unit 113 through the switch 63. In the digital signal processing unit 35, the timing control unit 113 generates a timing clock in accordance with the system clock pulse and the address generator unit 55 generates an address signal in accordance with the system clock pulse.

When the frequency of the synchronizing clock pulse is outside the predetermined range, the second synchronizing clock pulse from the clock converter unit 62 is supplied as the read reference clock pulse to the timing control unit 113. In the digital signal processing unit 35, the timing control unit 113 generates a timing clock in accordance with the second synchronizing clock pulse and the address generator unit 55 generates an address signal in accordance with the second synchronizing clock pulse.

Accordingly, when the deviation of the frequency of the synchronizing clock pulse from the standard frequency is great, the second synchronizing clock pulse, instead of the system clock pulse, is supplied as the read reference clock pulse to the digital signal processing unit 35. The frequency of the second synchronizing clock pulse is proportional to the frequency of the system clock pulse from the unit 58. Therefore, it is possible to appropriately balance the rate of writing the demodulated data signal from the demodulator unit 51 to the RAM 53 with the rate of reading out the demodulated data signal from the RAM 53 and supplying it to the CD-ROM control unit 57.

Hence, even if the variable range of the self-clock frequency is set to be wide, the reproducing rate control apparatus of the present invention makes it possible that the digital signal processing unit 35 to perform the error correcting and data transferring processes without arising a problem that the quantity of data to be written to or read from the RAM 53 exceeds the storage capacity of the RAM 53.

Figure 4:
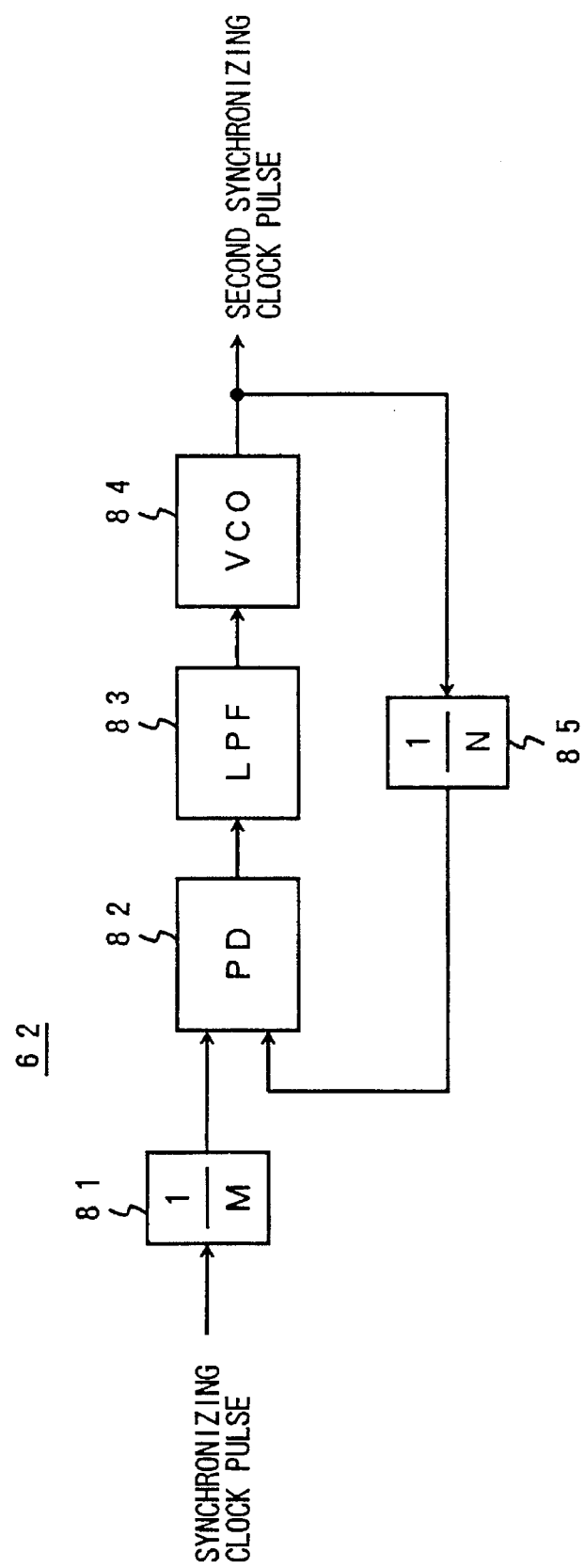
FIG. 4 is a block diagram of a clock converter unit in the CD-ROM reproducing system in FIG. 2.

FIG. 4 shows the clock converter unit 62 in the CD-ROM reproducing system in FIG. 2.

Referring to FIG. 4, the clock converter unit 62 includes a frequency divider (1/M) 81, a phase difference detector (PD) 82, a low-pass filter (LPF) 83, a voltage-controlled oscillator (VCO) 84, and a frequency divider (1/N) 85.

In the clock converter unit 62, a synchronizing signal output from the VCO 84 is supplied to the frequency divider (1/N) 85. The frequency divider (1/N) 85 outputs a synchronizing signal with a frequency divided by N where N is an integer, and this synchronizing signal is supplied to an input of the phase difference detector 82.

The synchronizing clock pulse from the synchronizing clock generating unit 33 is supplied to the frequency divider 81. The frequency divider (1/M) 81 outputs the synchronizing clock pulse with a frequency divided by M where M is an integer, and this synchronizing clock pulse is supplied the other input of the phase difference detector 82.

The phase difference detector (PD) 82 generates a phase-difference signal indicative of a voltage proportional to a difference between a phase of the synchronizing signal from the frequency divider (1/N) 85 and a phase of the synchronizing clock pulse from the frequency divider (1/M) 81.

The low-pass filter (LPF) 83 eliminates unnecessary frequency components from the phase-difference signal output from the phase difference detector 82.

After the unnecessary frequency components are eliminated by the low-pass filter (LPF) 83, the phase-difference signal from the low-pass filter (LPF) 83 is supplied to the voltage-controlled oscillator (VCO) 84. The VCO 84 generates a synchronizing clock pulse in accordance with the voltage indicated by the phase-difference signal, such that the phase difference of the synchronizing signal from the frequency divider (1/N) 85 and the synchronizing clock pulse from the frequency divider (1/M) 81 equals zero.

Accordingly, the clock converter unit 62 generates a second synchronizing clock pulse with a modified frequency from the synchronizing clock pulse output from the synchronizing clock generating unit 33, and the modified frequency of the second synchronizing clock pulse is N/M times the initial frequency of the synchronizing clock pulse from the synchronizing clock generating unit 33.

Figure 5:
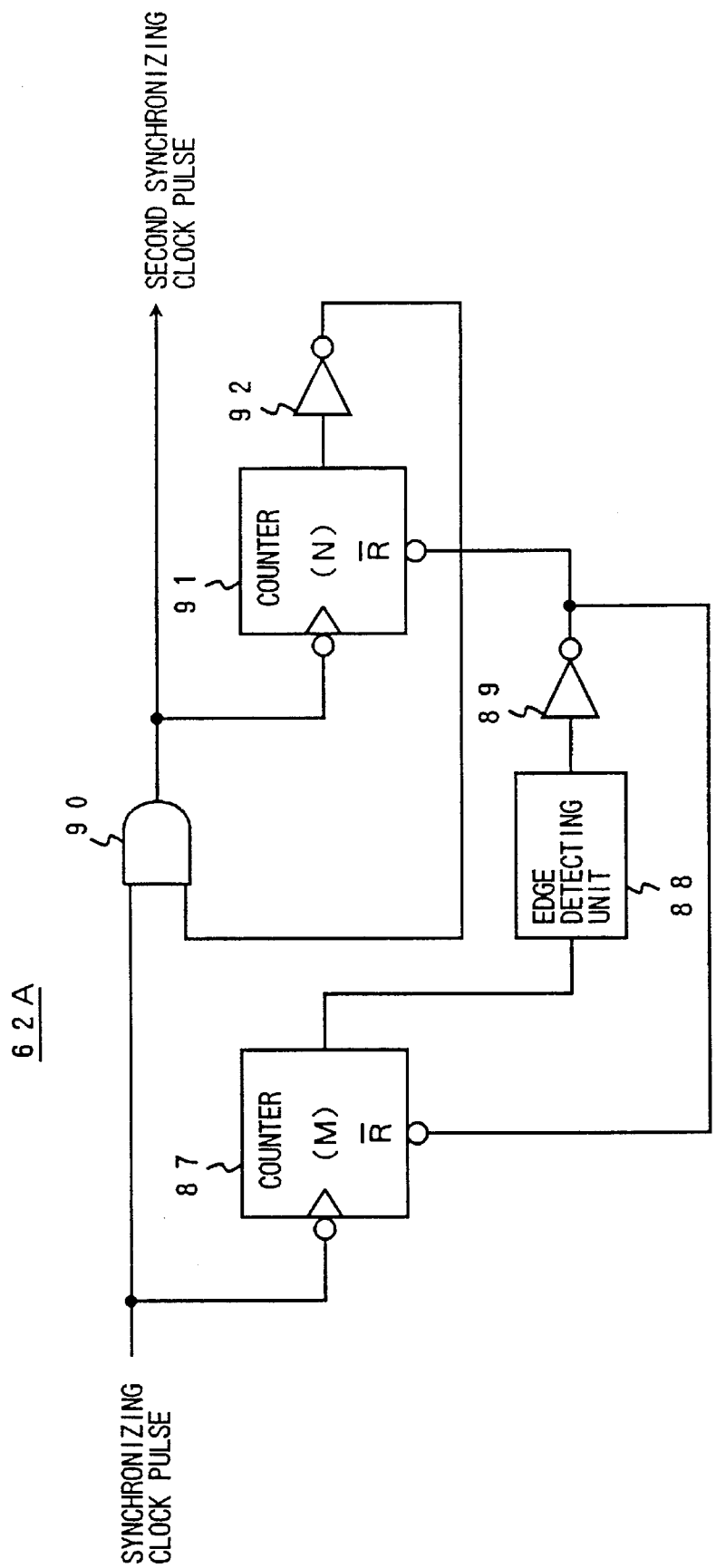
FIG. 5 is a block diagram of another clock converter unit in the CD-ROM reproducing system in FIG. 2.

FIG. 5 shows another clock converter unit 62A in the CD-ROM reproducing system in FIG. 2. This clock converter unit 62A is applicable to a case of M>N.

Referring to FIG. 5, the clock converter unit 62A includes a counter (M) 87, an edge detecting unit 88, an inverter 89, an AND circuit 90, a counter (N) 91, and an inverter 92.

The counter (M) 87 generates a high-level signal "H" when "M" synchronizing clock pulses from the synchronizing clock generating unit 33 are supplied to the counter 87. The counter (N) 91 generates a high-level signal "H" when "N" synchronizing clock pulses, output from the AND circuit 90, are counted by the counter 91.

The edge detecting unit 88 generates a pulse in response to a rising edge of the high-level signal "H" output from the counter (M) 87. Since M>N, if the counting of the synchronizing clock pulses is started by the counters 87 and 91 after the counters 87 and 91 are reset, the counter (N) 91 outputs the high-level signal "H" earlier than the counter (M) 87. The high-level signal "H" from the counter (N) 91 is supplied to the inverter 92, and the inverter 92 outputs a low-level signal "L" to an input of the AND circuit 90. This inhibits the output of the synchronizing clock pulses by the AND circuit 90.

The counter (M) 87 subsequently outputs the high-level signal "H" when "M" synchronizing clock pulses are counted. The edge detecting unit 88 outputs a pulse in response to the rising edge of the high-level signal "H" from the counter 87. The pulse output from the inverter 89 is supplied to the inverter 89, and the inverter 89 outputs a low-level signal "L" to both a reset input of the counter (M) 87 and a reset input of the counter (N) 91. The counters 87 and 91 at this time are reset by the low-level signal "L", and the counting of the synchronizing clock pulses is restarted.

FIG. 6 shows the frequency detecting unit 61 in the CD-ROM reproducing system in FIG. 2. FIGS. 7A through 7F show waveforms of signals at various points of the frequency detecting unit 61.

Referring to FIG. 6, the frequency detecting unit 61 includes a counter 95, a frequency divider 96, an edge detector 97, an inverter 98, a comparator 99, a comparator 100, an AND circuit 101, and a flip-flop 102.

The frequency divider 96 inputs the synchronizing clock pulse with an initial frequency, and generates the synchronizing clock pulse with a modified frequency at an output P1, the modified frequency being equal to the initial frequency divided by "M". See FIG. 7A.

The edge detector 97 inputs the synchronizing clock pulse with the modified frequency output from the frequency divider 96, and generates a pulse at an output P2 in accordance with a rising edge of the synchronizing clock pulse. See FIG. 7B.

The pulse from the edge detector 97 is inverted by the inverter 98, and the inverted pulse is supplied to a reset terminal of the counter 95 as a reset signal. The pulse from the edge detector 97 is supplied to a clock terminal of the flip-flop 102.

The counter 95 inputs a sequence of system clock pulses from the system clock generator unit 58, and generates a count value indicative of a frequency of the synchronizing clock pulse (or a number of the system clock pulses which are inputted after the counter 95 is reset by the above pulse). A signal indicating the count value, output from the counter 95, is supplied to each of an input terminal "B" of the comparator 99 and an input terminal "A" of the comparator 100.

A signal indicative of a reference value $N_L$ is supplied to an input terminal "A" of the comparator 99. This reference value $N_L$ indicates a lower limit frequency in a predetermined range of frequencies of the synchronizing clock pulse. The comparator 99 generates a high-level signal "H" at an output P4 when the count value from the counter 95 is below the reference value $N_L$. Otherwise the comparator 99 generates a low-level signal "L" at the output P4. See FIG. 7D.

A signal indicative of a reference value $N_S$ is supplied to an input terminal "B" of the comparator 100. This reference value $N_S$ indicates an upper limit frequency in the predetermined range of frequencies of the synchronizing clock pulse. The comparator 100 generates a high-level signal "H" at an output P3 when the count value from the counter 95 is above the reference value $N_S$. Otherwise the comparator 100 generates a low-level signal "L" at the output P3. See FIG. 7C.

The AND circuit 101 has an input connected to the output P3 of the comparator 100 and an input connected to the output P4 of the comparator 99. The AND circuit 101 generates a high-level signal "H" at an output P5 when the high-level signal "H" from the comparator 99 and the high-level signal "H" from the comparator 100 are input. Otherwise the AND circuit 101 generates a low-level signal "L" at the output P5. See FIG. 7E.

The flip-flop 102 latches the signal output from the AND circuit 101 in accordance with the rising edge of the pulse supplied from the edge detecting unit 97. See FIG. 7F. A high-level signal "H" output from the flip-flop 102 is the frequency detection signal output from the frequency detecting unit 61.

Referring to FIGS. 7A through 7F, the synchronizing clock signal at the output P1 of the frequency divider 96 has a period from "t0" to "t4". At "t0", the flip-flop 102 outputs a high-level signal "H" for a previous period of the synchronizing clock signal output from the frequency divider 96.

A pulse at the output P2 of the edge detecting unit 97 is generated at "t0", and the counter 95 is reset by this pulse. Thus, the count value at this time is equal to zero. The comparator 100 outputs the low-level signal "L" and the comparator 99 outputs the high-level signal "H". After the counter 95 is reset, the counting of the system clock pulses is started by the counter 95.

The count value generated by the counter 95 reaches the reference value $N_S$ at "t2". The signal at the output P3 of the comparator 100 is changed from "L" to "H" at this time. Accordingly, the signal at the output P5 of the AND circuit 101 is changed from "L" to "H".

The count value generated by the counter 95 reaches the reference value $N_L$ at "t3". The signal at the output P4 of the comparator 99 is changed from "H" to "L" at this time. Accordingly, the signal at the output P5 of the AND circuit 101 is changed from "H" to "L".

A following pulse at the output P2 of the edge detecting unit 97 is generated at "t4". The signal output from the AND circuit 101 is held by the flip-flop 102. In the present case, the output of the AND circuit 101 during the time from "t3" to "t4" is the low-level signal "L", and the flip-flop 102 outputs the low-level signal "L" at "t4".

Figure 8:
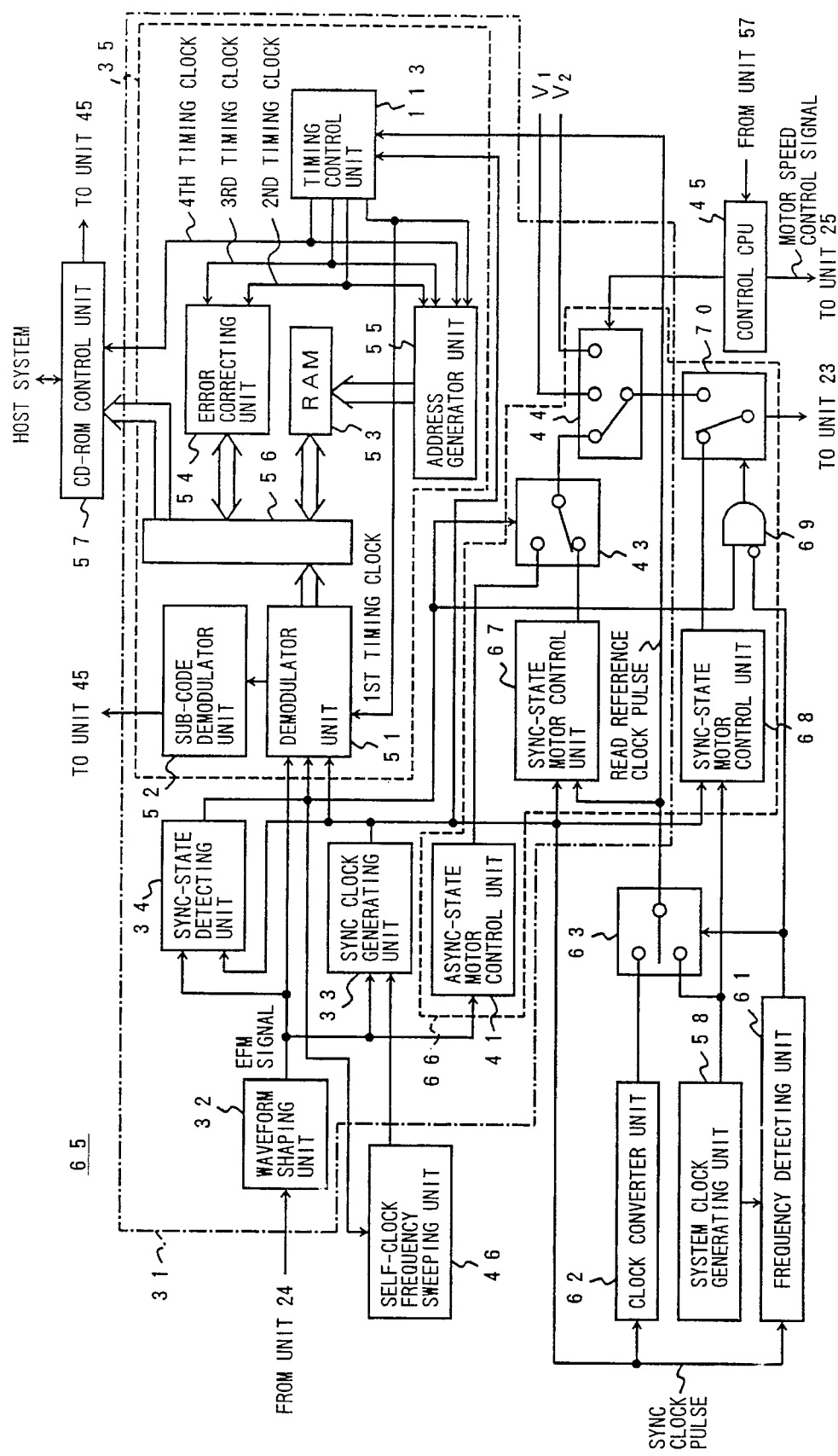
FIG. 8 is a block diagram of a CD-ROM reproducing system in a second embodiment of the present invention.

FIG. 8 shows a CD-ROM reproducing system 65 in a second embodiment of the present invention. In FIG. 8, the elements which are the same as corresponding elements in FIG. 2 are designated by the same reference numerals, and a description thereof will be omitted.

The CD-ROM reproducing system 65 includes an integrated signal processor 31, which is indicated by a one-dot chain line in FIG. 8. The integrated signal processor 31 is a single integrated circuit which includes the waveform shaping unit 32, the synchronizing clock generating unit 33, the synchronous-state detecting unit 34, the digital signal processing unit 35, the asynchronous-state motor control unit 41, a synchronous-state motor control unit 67, and the switches 43 and 44.

The integrated signal processor 31 includes the synchronous-state motor control unit 67. The synchronous-state motor control unit 67 is the same as the synchronous-state motor control unit 42, except it includes no unit which detects a phase difference between the phase of the synchronizing clock pulse and the phase of the system clock pulse.

The synchronous-state motor control unit 67 supplies a motor speed control signal to a switch 70 via the switches 43 and 44 when the synchronizing clock pulse is in the synchronous state.

A synchronous-state motor control unit 68 is provided outside the integrated signal processor 31. The synchronous-state motor control unit 68 compares a modified frequency of the synchronizing clock pulse (which is 1/M times the frequency of the synchronizing clock pulse from the unit 33) with a modified frequency of the system clock pulse (which is 1/N times the frequency of the system clock pulse from the unit 58). The synchronous-state motor control unit 68 generates a motor speed control signal indicative of the result of the comparison. The motor speed control signal from the unit 68 is supplied to the switch 70.

The switch 70 includes an input connected to the switch 44, an input connected to the synchronous-state motor control unit 68, and an output connected to the spindle motor 23. One of the motor speed control signal from the switch 44 and the motor speed control signal from the synchronous-state motor control unit 68 is selectively supplied to the spindle motor 23 through the switch 70.

An AND circuit 69 includes an input connected to the frequency detecting unit 61, an input connected to the synchronous-state detecting unit 34, and output connected to the switch 70. A detection signal from the frequency detecting unit 61 is inverted and the inverted detection signal is supplied to the AND circuit 69. A detection signal from the synchronous-state detecting unit 34 is supplied to the AND circuit 69.

The AND circuit 69 generates a switching control signal indicative of the AND of the inverted detection signal from the unit 61 and the detection signal from the unit 34. The switching control signal from the AND circuit 69 is supplied to the switch 70.

Accordingly, when the synchronizing clock pulse from the unit 33 is in the synchronous state with the EFM signal and the frequency of the synchronizing clock pulse is outside the predetermined range, the motor speed control signal from the synchronous-state motor control unit 68 is supplied to the spindle motor 23 through the switch 70. When the synchronizing clock pulse from the unit 33 is in the synchronous state with the EFM signal and the frequency of the synchronizing clock pulse is within the predetermined range, the motor speed control signal from the synchronous-state motor control unit 67 is supplied to the spindle motor 23 through the switch 70.

The CD-ROM reproducing system 65 in the second embodiment includes a spindle motor control unit 66, which is indicated by a dotted line in FIG. 8. The spindle motor control unit 66 includes the asynchronous-state motor control unit 41, the switches 43 and 44 (which are the same as in the first embodiment), the synchronous-state motor control units 67 and 68, the AND circuit 69, and the switch 70 (which are described above).

Similarly to the previously-described first embodiment, the CD-ROM reproducing system 65 in the second embodiment selectively supplies one of the system clock pulse from the unit 58 and the second synchronizing clock pulse from the unit 62, as the read reference clock pulse, to the digital signal processing unit 35 through the switch 63.

When the synchronizing clock pulse from the synchronizing clock generating unit 33 is in the synchronous state and the frequency of the synchronizing clock pulse is outside the predetermined range, the motor speed control signal from the synchronous-state motor control unit 68 is supplied to the spindle motor 23 through the switch 70. The rotating speed of the spindle motor 23 is controlled by the motor speed control signal such that the frequency of the synchronizing clock pulse approaches the standard frequency.

When the synchronizing clock pulse from the synchronizing clock generating unit 33 is in the synchronous state and the frequency of the synchronizing clock pulse is within the predetermined range, the motor speed control signal from the synchronous-state motor control unit 67 is supplied to the spindle motor 23 through the switch 70. The rotating speed of the spindle motor 23 is controlled by the motor speed control signal such that the frequency of the synchronizing clock pulse accords with the standard frequency.

In the above-described second embodiment, even when the frequency of the synchronizing clock pulse is outside the predetermined range, the rotating speed of the spindle motor 23 can be correctly controlled by the motor speed control signal from the synchronous-state motor control unit 68.

In the above-described second embodiment, when the variable range of the self-clock frequency is set to be wide, it is possible that the digital signal processing unit 35 correctly perform the error correcting and data transferring processes without arising a problem that the quantity of data to be written to or read from the RAM 53 exceeds the storage capacity of the RAM 53.

A desired rotating speed to which the rotating speed of the spindle motor 23 is changed during the seeking operation of the pickup 24 can be freely determined by the control CPU 45. In such a case, the desired rotating speed is set to a maximum rotating speed of the spindle motor 23 at the desired track of the disk 21 which speed corresponds to a maximum frequency of the synchronizing clock pulse at which the phase of the synchronizing clock pulse can be locked to the phase of the EFM signal. This makes it possible to remarkably reduce the access time for the data reproduction after the end of the seeking operation.

Figure 9:
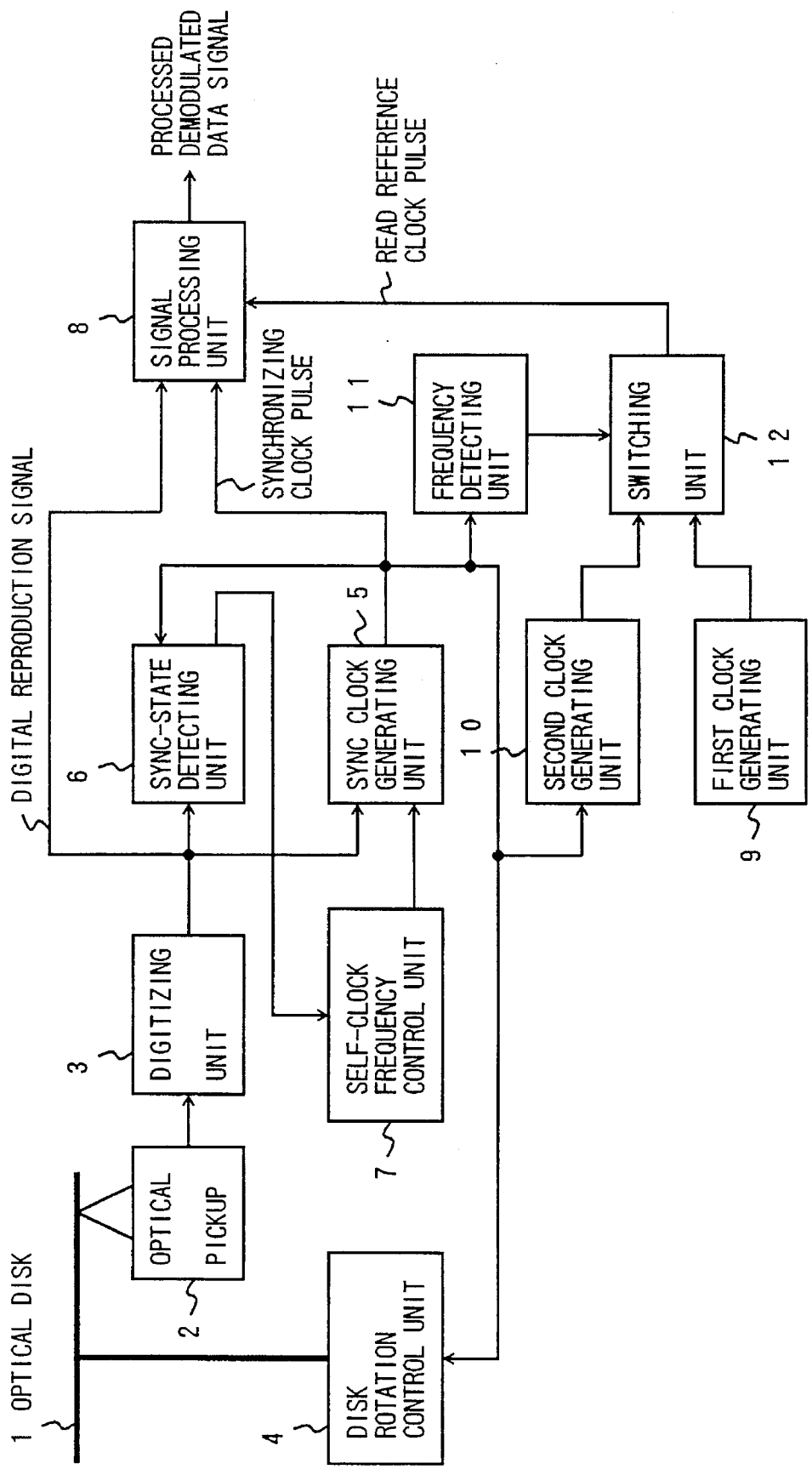
FIG. 9 is a block diagram of a reproducing rate control apparatus according to the principle of the present invention.

FIG. 9 shows the reproducing rate control apparatus for the optical disk according to the principle of the present invention.

Referring to FIG. 9, an optical disk 1 in which data pieces and clock components for respective data pieces are recorded on the disk 1 at a constant linear velocity is rotated by a disk rotation control unit 4. The disk rotation control unit 4 controls a rotating speed of the disk 1 so that the rotating speed of the disk 1 is kept at a reference-line rotating speed.

In the reproducing rate control apparatus, an optical pickup 2 generates a reproduction signal from the disk 1. A digitizing unit 3 generates a digital reproduction signal from the reproduction signal output from the pickup 2.

A synchronizing clock generating unit 5, which is coupled to an output of the digitizing unit 3, generates a synchronizing clock pulse with a phase locked to a phase of the digital reproduction signal when a bit frequency of the digital reproduction signal is within a capture range of frequencies centered at a self-clock frequency from an oscillator included in the synchronizing clock generating unit 5.

A synchronous-state detecting unit 6, which is coupled to the output of the digitizing unit 3 and an output of the synchronizing clock generating unit 5, detects whether the synchronizing clock pulse is in a synchronous state with the digital reproduction signal.

A self-clock frequency control unit 7, which is coupled to an output of the synchronous-state detecting unit 6, supplies a frequency control signal to the synchronizing clock generating unit 5 when the synchronizing clock pulse is in an asynchronous state with the digital reproduction signal. A time for the synchronizing clock pulse from the synchronizing clock generating unit 5 to be phase-locked to the digital reproduction signal is reduced by supplying the frequency control signal from the self-clock frequency control unit 7 to the synchronizing clock generating unit 5.

A signal processing unit 8, which is coupled to the output of the digitizing unit 3 and the output of the synchronizing clock generating unit 5, generates a demodulated data signal from the digital reproduction signal in accordance with the synchronizing clock pulse. In the signal processing unit 8, the demodulated data signal is written to a memory in accordance with the synchronizing clock pulse, the demodulated data signal is read from the memory in accordance with a read reference clock pulse, and the read demodulated data signal is processed through an error correction so that a processed demodulated data signal is output.

A first clock generating unit 9 generates a first read-reference clock pulse having an initial frequency from an oscillator.

A second clock generating unit 10, which is coupled to the output of the synchronizing clock generating unit 5, generates a second read-reference clock pulse having a second frequency proportional to a frequency of the synchronizing clock pulse.

A frequency detecting unit 10, which is coupled to the output of the synchronizing clock generating unit 5, detects whether the frequency of the synchronizing clock pulse is within a predetermined range of frequencies centered at a standard frequency.

A switching unit 12, which is coupled to an output of the first clock generating unit 9 and an output of the second clock generating unit 10, selectively outputs one of the first read-reference clock pulse and the second read-reference clock pulse to the signal processing unit 8 in accordance with a result of the detection by the frequency detecting unit 11.

In the above reproducing rate control apparatus, when the frequency of the synchronizing clock pulse is within the predetermined range, the first read-reference clock pulse is supplied from the switching unit 12 to the signal processing unit 8, and, when the frequency of the synchronizing clock pulse is outside the predetermined range, the second read-reference clock pulse is supplied from the switching unit 12 to the signal processing unit 8.

The present invention is not limited to the above embodiments of the CD-ROM reproducing system in which the sweeping of the self-clock frequency is performed by the self-clock frequency sweeping unit 46. Various variations and modifications may be made without departing from the scope of the present invention. For example, the present invention is applicable to an CD-ROM reproducing system in which the self-clock frequency is varied in accordance with a deviation of the frequency of the EFM signal at the end of the seeking operation.

In addition, the CD-ROM reproducing system in the above embodiments of the present invention may be used as an audio CD player. When an audio CD disk is loaded into the CD-ROM reproducing system, the operation of the self-clock frequency sweeping unit 46 is stopped. The self-clock frequency of the CD-ROM reproducing system is held at a certain frequency, and it is possible that an audio signal including no jitter can be correctly reproduced from the audio CD disk.

What is claimed is:

1. A reproducing rate control apparatus for an optical disk in which data pieces and clock components for respective data pieces are recorded on the disk at a constant linear velocity, comprising:

digitizing means for generating a digital reproduction signal from a reproduction signal which is generated by an optical pickup from said disk;

synchronizing clock generating means, coupled to an output of said digitizing means, for generating a synchronizing clock pulse with a phase locked to a phase of the digital reproduction signal;

signal processing means, coupled to the output of the digitizing means and an output of the synchronizing clock generating means, for generating a demodulated data signal from the digital reproduction signal in accordance with the synchronizing clock pulse, wherein the demodulated data signal is written to a memory in accordance with the synchronizing clock pulse, the demodulated data signal is read from the memory in accordance with a read reference clock pulse, and the read demodulated data signal is processed through an error correction so that a processed demodulated data signal is output;

frequency detecting means, coupled to the output of the synchronizing clock generating means, for detecting whether the frequency of the synchronizing clock pulse is within a predetermined range of frequencies centered at a standard frequency;

first clock generating means for generating a first read-reference clock pulse having an initial frequency from an oscillator;

second clock generating means, coupled to the output of the synchronizing clock generating means, for generating a second read-reference clock pulse having a second frequency proportional to a frequency of the synchronizing clock pulse; and switching means, coupled to an output of the first clock generating means and an output of the second clock generating means, for selectively outputting one of the first read-reference clock pulse and the second read-reference clock pulse to said signal processing means in accordance with a result of the detection by the frequency detecting means, wherein, when the frequency of the synchronizing clock pulse is within the predetermined range, the first read-reference clock pulse is supplied from the switching means to the signal processing means, and, when the frequency of the synchronizing clock pulse is not within the predetermined range, the second read-reference clock pulse is supplied from the switching means to the signal processing means.

2. The reproducing rate control apparatus according to claim 1, further comprising:

synchronous-state detecting means, coupled to the output of the digitizing means and the output of the synchronizing clock generating means, for detecting whether the synchronizing clock pulse is in a synchronous state with the digital reproduction signal.

3. The reproducing rate control apparatus according to claim 2, further comprising:

self-clock frequency control means, coupled to an output of the synchronous-state detecting means, for supplying a frequency control signal to the synchronizing clock generating means when the synchronizing clock pulse is in an asynchronous state with the digital reproduction signal, thereby reducing a time for the synchronizing clock pulse from the synchronizing clock generating means to be phase-locked to the digital reproduction signal.

4. The reproducing rate control apparatus according to claim 1, wherein said signal processing means comprises:

the memory for storing the demodulated data signal;

demodulator means, coupled to the output of the digitizing means and the output of the synchronizing clock generating means, for generating the demodulated data signal from the digital reproduction signal in accordance with the synchronizing clock pulse;

error correcting means for processing the demodulated data signal, read from the memory, through the error correction, to output the processed demodulated data signal; and a bus which interconnects the memory, the demodulator means and the error correcting means.

5. The reproducing rate control apparatus according to claim 4, wherein said signal processing means further comprises:

timing control means, coupled to the output of said synchronizing clock generating means and an output of said switching means, for generating a write timing signal in synchronism with the synchronizing clock pulse and generating a read timing signal in synchronism with the read reference clock pulse; and address generating means, coupled to outputs of said timing control means, for generating an address signal indicative of a location of the memory to which the demodulated data signal is written, in response to the write timing signal, and generating an address signal indicative of a location of the memory from which the demodulated data signal is read, in response to the read timing signal.

6. The reproducing rate control apparatus according to claim 1, wherein said frequency detecting means comprises a first comparator which generates an ON signal when the frequency of the synchronizing clock pulse is above a lower limit frequency of the predetermined range, and a second comparator which generates an ON signal when the frequency of the synchronizing clock pulse is below an upper limit frequency of the predetermined range.

7. The reproducing rate control apparatus according to claim 1, wherein said second clock generating means comprises a first frequency divider which generates a synchronizing clock pulse with a 1/M times frequency, where M is an integer, and a second frequency divider which generates a synchronizing clock pulse with a 1/N times frequency, where N is an integer.

8. The reproducing rate control apparatus according to claim 7, wherein said second clock generating means further comprises a phase difference detector which generates a voltage signal indicative of a phase difference between the clock pulse from the first frequency divider and the clock pulse from the second frequency divider, and a voltage-controlled oscillator coupled to an output of the phase difference detector.

9. The reproducing rate control apparatus according to claim 1, wherein said second clock generating means comprises a first counter which generates a high-level level signal when "M" synchronizing clock pulses, output from the synchronizing clock generating means, are supplied to the first counter, where M is an integer, and a second counter which generates a high-level signal when "N" synchronizing clock pulses, output from the synchronizing clock generating means, are supplied to the second counter, where N is an integer and M>N.

10. The reproducing rate control apparatus according to claim 9, wherein said second clock generating means further comprises an edge detecting unit which generates a pulse in response to a rising edge of the high-level signal output from the first counter.

* * * * *